June 20, 1967    J. W. HYLAND, JR    3,326,737
METHOD AND APPARATUS FOR APPLYING SHEET
MATERIAL TO CORRUGATED BOARD
Filed Nov. 18, 1963    4 Sheets-Sheet 1

INVENTOR.
JAMES W. HYLAND JR.
BY Philip M. Rice
& W. A. Schaich
ATTORNEYS

June 20, 1967  J. W. HYLAND, JR  3,326,737
METHOD AND APPARATUS FOR APPLYING SHEET
MATERIAL TO CORRUGATED BOARD
Filed Nov. 18, 1963 4 Sheets-Sheet 3

INVENTOR.
JAMES W. HYLAND JR.
BY *Philip M. Rice*
*W. A. Schoich*
ATTORNEYS

United States Patent Office 3,326,737
Patented June 20, 1967

3,326,737
METHOD AND APPARATUS FOR APPLYING SHEET MATERIAL TO CORRUGATED BOARD
James W. Hyland, Jr., Maumee, Ohio, assignor to Owens-Illinois Inc., a corporation of Ohio
Filed Nov. 18, 1963, Ser. No. 324,560
4 Claims. (Cl. 156—470)

This invention relates generally to a method of laminating sheet material to corrugated board and more particularly to a method for accomplishing such lamination without crushing the corrugations of said board. It also relates to apparatus for accomplishing such lamination.

In the lamination of sheet material to corrugated board, it is customary to feed the corrugated board with the sheet material superimposed thereon between the nip of the pair of pressure rollers to bring the sheet material into firm engagement with the corrugated board to thereby effect a firm interfacial bond therebetween. Difficulty is encountered in such operation in that the pressure exerted on the corrugated board by the rollers frequently results in the crushing or collapsing of the corrugations of said board. The problem is especially critical in the extrusion coating of corrugated board. Thus, in the extrusion coating of corrugated board, the board is fed beneath an extruder which applies a film of heated thermoplastic material. Bonding between the film and the corrugated board is effected by the rolls pressing the film firmly against the board so that the lower surface of heated, and thus softened, thermoplastic material is urged into the fibers of the corrugated board. The pressing, coupled with the momentary softening of the corrugated board surface caused by contact of the heated film thereto, can easily cause the above-mentioned crushing.

Accordingly, it is an object of this invention to provide a method of laminating sheet material to corrugated board without crushing or collapsing the corrugations of said board.

Another object of this invention is to provide a method of extrusion coating sheet material to corrugated board.

A further object of this invention is to provide apparatus for introducing pressured fluid into the flutes of corrugated board.

Other objects and advantages of this invention will become readily apparent to those skilled in the art from the following detailed description taken in connection with the annexed sheets of drawings on which:

In brief, this invention comprises feeding corrugated board with sheet material superimposed thereon between the nip of a pair of pressure rollers. The corrugated board is fed so that the flutes of the corrugations are parallel to the axes about which the respective rollers rotate. A pair of rotating wheels engage opposite edges of the corrugated board at the nip of the rollers. Pressured fluid is introduced into the flutes of the corrugated board through the rotating wheels to thereby partially offset the pressure applied to the board by the pressure rollers. This pressured fluid, together with the inherent strength of the corrugated board itself, is sufficient to prevent the collapse of the corrugations between the pressure rollers.

Figure 7:
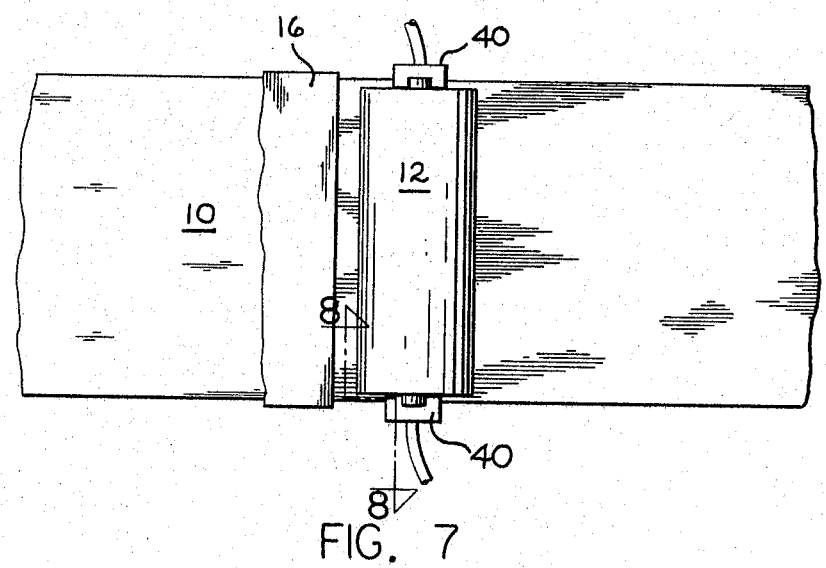
FIGURE 7 is a schematic top plan view showing modified apparatus for introducing pressured fluid into the corrugated board.

The rotating wheels, or, in the case of the FIGURE 7 embodiment, the pressure heads are designed to effect a seal with the respective edges of the corrugated board so that the pressured fluid is directed into those flutes which are subjected to pressure from the rollers with only minimal amounts of pressured fluid escaping to the atmosphere.

Referring now to the drawings, there is provided a sheet of corrugated board 10 continuously moving on a conveyor (not shown) between a pair of vertically aligned rollers 12 and 14. The upper roller 12 is urged into firm engagement with the upper surface of the corrugated board 10 by means of springs (not shown). An extrusion die 16 is positioned tansversely of the corrugated board 10 to extrude a sheet or film 18 of thermoplastic material, a polyolefin for example, onto the upper surface of the corrugated board 10 just prior to its entering the nip of the rollers 12 and 14. Inasmuch as the sheet 18 of thermoplastic material is extruded in a heated condition, the roller 12 is provided with cooling means (not shown) to chill and set said thermoplastic material. The application of thermoplastic film to paperboard in this manner causes the film to adhere to such board with no adhesives required. Such method of coating a sheet of fibrous material is broadly old in the art and does not require further description.

A pair of rotating wheels 20 are positioned to engage opposite edges of the corrugated board in substantial alignment with the rollers 12 and 14. Each of the wheels 20 is supported on an air inlet line 22 and is freely rotatable thereon by means of bushings 24. The wheels 20 have upper and lower cover plates 26 to which are connected a plurality of radially extending vanes 28 defining pie-shaped chambers 29 for directing the pressured air from line 22 to the edge of the corrugated board 10. The inlet air line 22 is provided with a slot 36 which directs the pressured air to the chamber 29 then communicating with the edge of the corrugated board 10. Thus, the pressured air is directed from the line 22 through the respective chamber or chambers aligned with the slot 36 into opposite edges of the board 10. The width of the slot 36 is equal to or less than the distance between the inlet end of adjacent vanes so that air is directed only to one chamber if the wheel 20 is in the rotational position illustrated in FIGURE 4 or FIGURE 6 but is directed to two chambers if the wheel 20 is in the rotational position illustrated in FIGURE 5.

Figure 1:
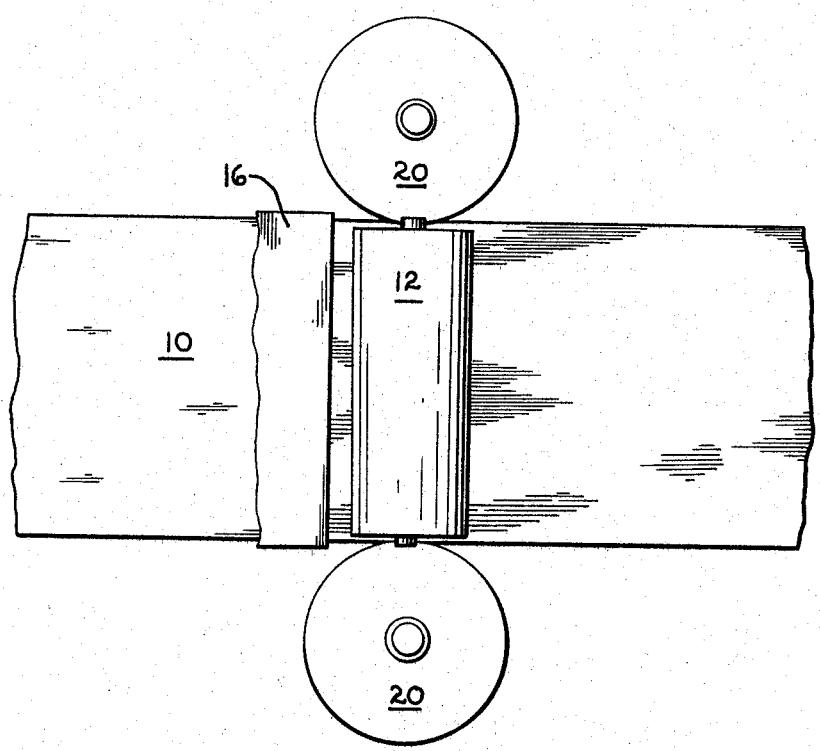
FIGURE 1 is a schematic top plan view of the apparatus of the present invention.
Figure 2:
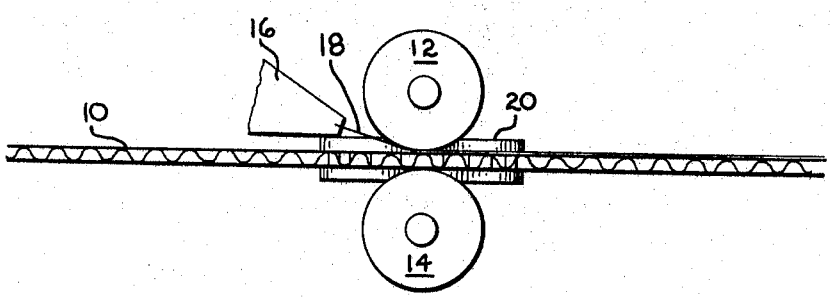
FIGURE 2 is a schematic elevational view of the apparatus of FIGURE 1 with one of the wheels omitted for purposes of clarity.
Figure 3:
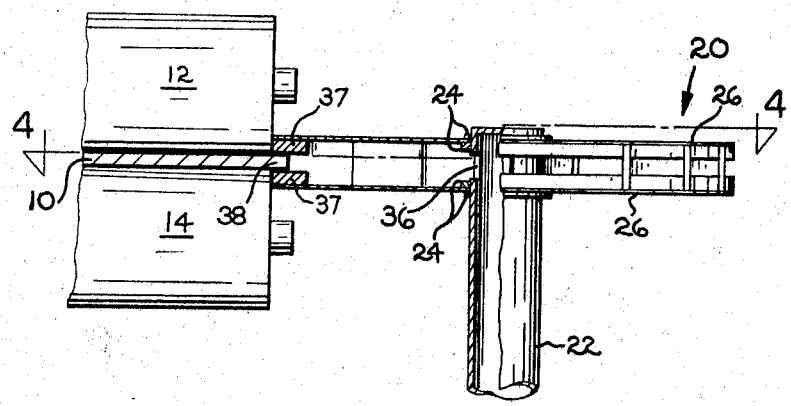
FIGURE 3 is a partial sectional view taken along line 3—3 of FIGURE 4.
Figure 4:
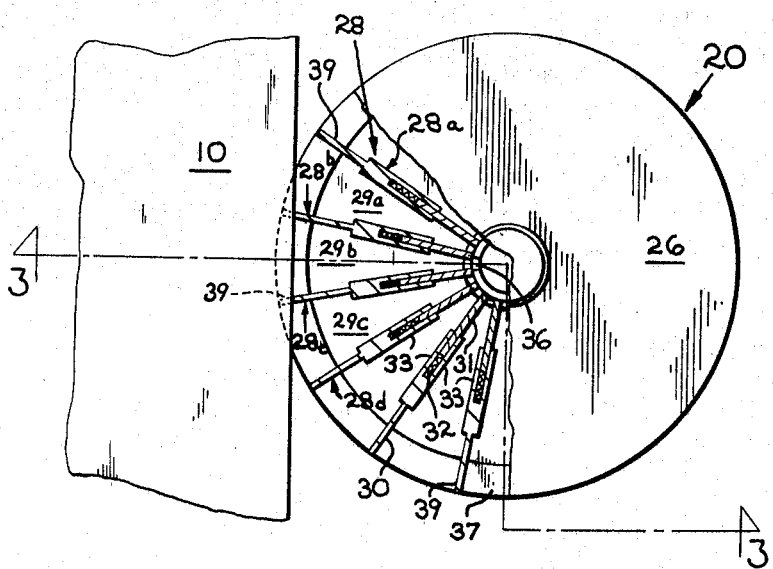
FIGURE 4 is a partial sectional view taken along line 4—4 of FIGURE 3.
Figure 5:
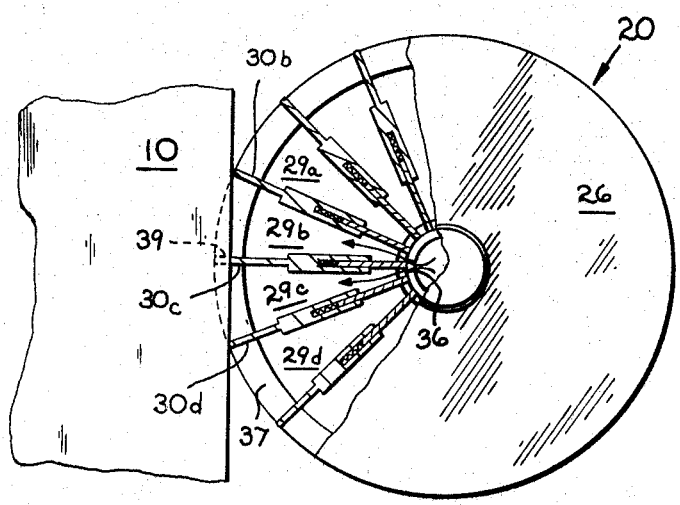

It can be easily seen unless suitable provisions are made there will exist the problem of preventing the escape of pressured air during the interval that one pie-shaped chamber 29 is moving out of communication with the edge of the corrugated board 10 and its adjacent chamber is moving into communication with such corrugated board edge. Thus, as shown in FIGURE 4 the chamber 29b is aligned so that it is the only chamber receiving pressured fluid from the line 22 and transmitting it to the corrugated board. However, as may be readily seen, there is a period when two adjacent chambers, chambers 29b and 29c for the wheel positioning illustrated in FIGURE 5, are both receiving pressured air from the line 22 as a result of the vanes 28c spanning the slot 36. In order to insure that the edge of the corrugated board is engaged at all times by at least two vanes 28, each of the vanes 28 is provided with an end element 30 which is slideably engaged with a fixed element 31. The end elements 30 are urged outwardly into contact with the edge of the board 10 by means of a spring 32. Each of the end elements 30 have integrally formed therewith a pair of spaced apart legs 33 which telescope on opposite sides of the respective fixed elements 31.

Figure 6:
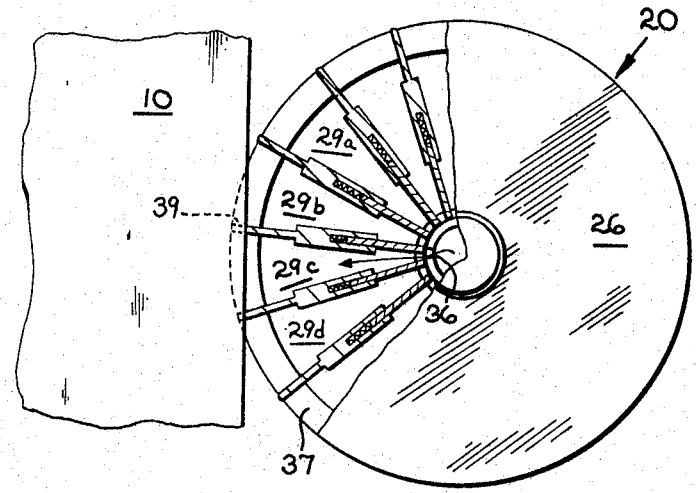
FIGURES 5 and 6 are views similar to FIGURE 4 showing further rotation of the rotating wheels.

As the wheel 20 rotates, a given end element 30 will initially contact the edge of the board 10 when it is at its outermost position. Continued rotation of the wheel causes the end element 30 to be urged by the edge of the board 10 inwardly against the spring 32. In the sequence of rotational positions illustrated in FIGURES 4 through 6, it may be seen that the wheel is moved from a position where only a single chamber 29b is receiving pressured fluid through the slot 36 and transmitting it to the edge of the board (FIGURE 4) to a position where two chambers 29b and 29c are receiving pressured fluid through the slot 36 and transmitting it to the edge of the board 10 (FIGURE 5) and again to a position where a single chamber 29c is receiving pressured fluid through the slot 36 and transmitting it to the edge of the board 10 (FIGURE 6). When, because of the rotational movement of the wheel 20, one of the vanes, 28b in FIGURE 5 for example, by virtue of its position at right angles to the edge of the board 10, would otherwise be the only vane to contact the edge of the board, the spring-loaded end element 30 is pushed inwardly by the edge of the board so that the board is contacted not only by that end element 30c but also by the adjacent end elements 30b and 30d. Such provision of spring-loaded end elements 30 thus insures that the edge of the corrugated board is always engaged by at least two, and periodically by three, of the edge elements 30 thereby insuring a minimal loss of pressured fluid.

Each of the wheels has upper and lower compressible annular members 37 secured respectively to the periphery of the upper and lower cover plates 26. The upper and lower compressible members 37 are spaced apart to define an annular slot 38 through which the pressured fluid is directed to the edge and into the flutes of the corrugated board. The end elements are snugly, but slideably, received in radial slots 39 of the compressible members 37. Such engagement between the end element 30 and the compressible members 37 coupled with the fact that the compressible members 37 are formed of a compressible material which is capable of effectively sealing the edge of the corrugated board results in only a negligible quantity of pressured fluid escaping to the atmosphere. The inner ends of the vanes 28 abut the outer surface of line 22 so that substantially all of the pressure air from line 22 is directed to the chamber then in communication with the corrugated board 10 with only a negligible amount being lost to the other pie-shaped chambers.

In operation, the corrugated board 10 is moved longitudinally under the extrusion die 16 where a film 18 of heated thermoplastic material is extruded thereto. The corrugated board 10 with the film 18 applied thereto is then fed between the vertically aligned rollers 12 and 14 where, by virtue of the spring urged action of roller 12, the film 18 is pressed into firm interfacial engagement with the corrugated board 10. The corrugated board 10 is aligned so that the flutes of the corrugations are parallel to the longitudinal axes of the rollers 12 and 14. While the corrugated board 10 with the film 18 is subjected to the pressure from the rollers 12 and 14, pressured air from the rotating wheels 20 is introduced into opposite edges of the corrugated board 10. Such pressure fluid together with the inherent strength of the corrugated board is sufficient to prevent the rollers 12 and 14 from collapsing the corrugated board.

Figure 8:
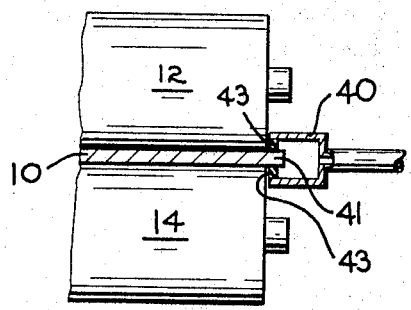
FIGURE 8 is a sectional view taken along line 8—8 of FIGURE 7.

In the embodiment shown in FIGURES 7 and 8, there is provided a pressure head 40 positioned on each side of the corrugated board 10 in alignment with the rollers 12 and 14. The pressure heads 40 have slots 41 through which the respective edges of the corrugated board are fed. Pressured fluid is fed to the heads 40 through lines 42. The heads have strips 43 of compressible material surrounding the slots to insure that the pressure fluid is directed to the corrugation. The operation under this embodiment is substantially the same as that under the previous embodiment.

It can be easily seen from the foregoing that this invention provides a novel method and apparatus for supporting corrugated board when it is fed between a pair of rollers. Although the invention has been described in conjunction with applying the film or sheet of thermoplastic material to one surface of the board, it should be readily understood that both the method and the apparatus are adaptable for use in applying other types of sheet material onto the corrugated board. For example, it may be desirable to apply an exterior label ply to the corrugated board which requires adhesives to effect the bond therebetween. Further, the invention may be used in applying sheet material to both surfaces of the corrugated board.

As used herein, the terms "laminating sheet material to corrugated board" includes the extrusion coating of thermoplastic film on corrugated board using no adhesives as well as lamination of sheet material utilizing adhesives.

It is apparent that numerous modifications will become readily apparent to those skilled in the art. Accordingly, it is not the intention to limit the scope of the patent granted hereon otherwise than is necessitated by the following claims.

I claim:

1. Apparatus for progressively introducing pressured fluid into the flutes of corrugated board comprising a circular rotatable wheel having an annular slot adapted to snugly receive the edge of said corrugated board, said wheel including plurality of chambers communicating with said annular slot, each of said chambers defined by a pair of spaced apart radially extending members and upper and lower cover members, means for urging said radially extending members outwardly toward the periphery of said wheel, said urging means adapted to permit said radially extending members to be moved radially inwardly upon application of an inwardly directed force, said radially extending members so positioned that at least two of said members will engage the edge of the board received in said annular slot and means for directing pressured fluid to the chambers communicating with said board.

2. In apparatus for laminating sheet material to corrugated board wherein said sheet material is brought into interfacial engagement with said corrugated board and the combination thus formed is fed between the nip of a pair of pressure rollers so that the flutes of said corrugated board are parallel to the longitudinal axes of said rollers, the improvement comprising a pair of rotatable wheels directing pressured fluid into said flutes, said wheels aligned with the axes of said rollers, each of said wheels including a pair of annular members spaced apart to define an annular slot adapted to snugly engage the edge of said corrugated board and means for directing pressured fluid to the portion of said slot engaging said corrugated board.

3. Apparatus for directing pressured fluid into an edge of a hollow panel comprising upper and lower circular members freely rotatable on a central axis, a plurality of radially extending members separating said circular members and cooperating therewith to define a plurality of chambers, said upper and lower circular members having annular resilient members cooperating to define an annular slot adapted to snugly receive the edge of said hollow panel, said radially extending members each comprising an inner member fixed relative to said circular members and an outer member adapted for radial movement in slideable engagement with said inner member, means urging said outer member radially outwardly, said radially extending members so positioned that at least two of said members will engage said panel edge, and means directing pressured fluid toward chambers communicating with said panel edge.

4. The apparatus defined in claim 3 wherein said means directing pressured fluid comprises a central tubular member rotatably supporting said circular members, said tubular member having an aperture radially directed toward the point of engagement between said panel edge and said annular slot.

References Cited

UNITED STATES PATENTS

| 746,807 | 12/1903 | Ferres | 156—470 |
| 2,166,749 | 7/1939 | Burrill | 156—471 |
| 2,236,056 | 3/1941 | Grimm | 156—205 |
| 3,193,406 | 7/1965 | Mittleman | 117—120 |

EARL M. BERGERT, *Primary Examiner.*

H. F. EPSTEIN, *Assistant Examiner.*